(12) United States Patent
Takisawa et al.

(10) Patent No.: US 8,044,871 B2
(45) Date of Patent: Oct. 25, 2011

(54) HYBRID ANTENNA UNIT

(75) Inventors: Hisashi Takisawa, Akita (JP); Junichi Noro, Akita (JP); Takao Kato, Oga (JP); Kenichi Kamada, Akita (JP); Kyuichi Sato, Oga (JP)

(73) Assignee: Mitsumi Electric Co., Ltd., Tama-Shi, Tokyo (JP)

( * ) Notice: Subject to any disclaimer, the term of this patent is extended or adjusted under 35 U.S.C. 154(b) by 334 days.

(21) Appl. No.: 12/482,884

(22) Filed: Jun. 11, 2009

(65) Prior Publication Data
US 2010/0315305 A1 Dec. 16, 2010

(51) Int. Cl.
*H01Q 1/32* (2006.01)
*H01Q 1/38* (2006.01)
(52) U.S. Cl. .................. 343/713; 343/700 MS; 343/715
(58) Field of Classification Search .................. 343/713, 343/715, 700 MS, 725, 729, 711
See application file for complete search history.

(56) References Cited

U.S. PATENT DOCUMENTS

| 6,501,427 | B1 * | 12/2002 | Lilly et al. | 343/700 MS |
| 7,633,452 | B2 * | 12/2009 | Noro et al. | 343/713 |
| 2006/0290580 | A1 | 12/2006 | Noro et al. | |
| 2009/0002229 | A1 | 1/2009 | Noro et al. | |
| 2010/0328179 | A1 * | 12/2010 | Takisawa et al. | 343/841 |

FOREIGN PATENT DOCUMENTS
JP 2001-267843 A 9/2001
JP 2007-13293 A 1/2007

\* cited by examiner

*Primary Examiner* — Hoanganh Le
(74) *Attorney, Agent, or Firm* — Holtz, Holtz, Goodman & Chick, P.C.

(57) ABSTRACT

A hybrid antenna unit includes a circuit board having top and bottom surfaces, a planer antenna element which is mounted on the top surface of the circuit board and which receives first and second radio waves, an antenna base and a top cover that cover the circuit board and the planer antenna element. A bar antenna element stands on the top cover in a slanting position. A processing unit is mounted on the bottom surface of the circuit board and is connected to the planer antenna element. The processing unit processes the first and the second radio waves. A shielding case is mounted on the bottom surface of the circuit board and shields the processing unit. A booster circuit is mounted on the circuit board and is for use in the bar antenna element.

14 Claims, 6 Drawing Sheets

HYBRID ANTENNA UNIT

BACKGROUND OF THE INVENTION

This invention relates to a hybrid or compound antenna unit and, in particular, to a hybrid antenna unit for mounting a plurality of different antennas therein.

In the manner which is known in the art, recently, various different antennas are mounted in a vehicle such as an automobile. For example, there are, as such antennas, a GPS (Global Positioning System) antenna, an SDARS (Satellite Digital Audio Radio Service) antenna, a cellular phone antenna, an AM/FM radio antenna, or the like.

The GPS (Global Positioning System) is a satellite positioning system using artificial satellites which are called GPS satellites. The GPS is a system which receives radio waves (GPS signals) from four GPS satellites among twenty-four GPS satellites orbiting the Earth, measures, on the basis of the received waves, a position relationship and a time error between a mobile object and the four GPS satellites, and accurately calculates, on the basis of a principal of triangulation techniques, a position and/or a height of the mobile object on a map.

In recent years, the GPS is used in a car navigation system for detecting a position of a running automobile or the like and becomes widespread. In the car navigation system, a car navigation apparatus comprises a GPS antenna for receiving the GPS signals, a processing unit for processing the GPS signal received by the GPS antenna to detect a current position of the vehicle, a display unit for displaying, on the map, the position detected by the processing unit, and so on. A plane antenna such as a patch antenna is used as the GPS antenna.

On the other hand, the SDARS (Satellite Digital Audio Radio Service) is a radio service according to a digital radio broadcasting using artificial satellites (which will called "SDARS satellites" hereinafter) in the United States of America. That is, in recent years, a digital radio receiver, which receives the satellite wave from the SDARS satellites or the terrestrial wave so as to listen to the digital radio broadcasting, has been developed and is put to practical use in the United States of America. Specifically, two broadcasting stations called XM and Sirius provide radio programs on 250 or more channels in total. The digital radio receiver is generally mounted on a mobile object such as an automobile and is adapted to receive a radio wave having a frequency of about 2.3 gigahertz (GHz) as a received wave to listen to the digital radio broadcasting. In other words, the digital radio receiver is a radio receiver capable of listening to mobile broadcasting. Inasmuch as the received wave has the frequency of about 2.3 GHz, a reception wavelength (resonance frequency) A thereof is equal to about 128.3 mm. It is noted here that the terrestrial wave is a radio wave obtained by receiving the satellite wave at a ground station, slightly shifting the frequency of the satellite wave, and retransmitting the linear polarized wave. Thus, the terrestrial wave is the linear polarized wave exhibiting linear polarization while the satellite wave is a circular polarized wave exhibiting circular polarization. A plane antenna such as a patch antenna is used as the SDARS antenna.

An XM satellite radio antenna apparatus normally serves to receive circular polarized radio waves from two stationary satellites and, in an insensitive zone of the circular polarized waves, receives a radio wave by using a terrestrial linear polarization portion of the radio antenna apparatus. On the other hand, a Sirius satellite radio antenna apparatus normally serves to receive circular polarized radio waves from three orbiting satellites (synchronous type) and, in the insensitive zone, receives a radio wave by a terrestrial linear polarization portion of the radio antenna apparatus.

As described above, the radio wave having the frequency of about 2.3 GHz is used in the digital radio broadcasting. Therefore, an antenna for receiving the radio wave must be located outside as known in the art. If the digital radio receiver is mounted in the mobile object such as the automobile, the antenna unit is often attached to a roof of the mobile object (car body).

A hybrid antenna unit is disclosed in U.S. Patent Application Publication No. US 2006/0290580 A1 which will be called a first patent document. The hybrid antenna unit disclosed in the first patent document comprises a main circuit board having first and second surfaces opposite to each other, a first antenna unit, mounted on the first surface, for receiving a first radio wave from a first kind of artificial satellites, and a second antenna unit, mounted on the first surface, for receiving a second radio wave from a second kind of artificial satellites. The first antenna unit comprises the GPS antenna for receiving the first radio wave from the GPS satellites as the first kind of artificial satellites. The second antenna unit comprises the SDARS antenna for receiving the second radio wave from the SDARS satellites as the second kind of artificial satellites.

At any rate, the hybrid antenna unit disclosed in the first patent document comprises a first plane antenna used as the GPS antenna and a second plane antenna used as the SDARS antenna which are put side by side with each other. In addition, the hybrid antenna unit disclosed in the first patent document further comprises an antenna element and an antenna case in which the antenna element is inserted. The main circuit board is mounted in the antenna case. The antenna element comprises a first pole antenna element and a second pole antenna element The first pole antenna element is for receiving a radio wave of AM/FM radio bands while the second pole antenna element is for receiving and transmitting a radio wave for a cellular phone (e.g., a mobile telephone or a car telephone). That is, the second pole antenna is a cellular antenna. On the second surface of the main circuit board, a booster circuit for the first pole antenna element is mounted.

The hybrid antenna unit disclosed in the first patent document comprises two antenna units which put side by side with each other. The hybrid antenna unit is therefore disadvantageous in that it is upsized.

An antenna element is disclosed in U.S. Patent Application Publication No. US 2009/0002229 A1 which will be called a second patent document. The antenna element disclosed in the second patent document can receive a GPS signal and a SDARS signal as two kinds of electric waves. The antenna element comprises a dielectric board, a first antenna radiation electrode formed on a top surface of the dielectric board at an outer region, a second antenna radiation electrode formed on the top surface of the dielectric board at a central portion, a ground electrode formed on a bottom surface of the dielectric board, a feeding pattern formed on the side surface of the dielectric board for feeding to the first antenna radiation electrode by electromagnetic coupling, and a feeding pin having an end connected to the second antenna radiation electrode. A combination of the first antenna radiation electrode, the ground electrode, and the feeding pattern serves as a first antenna portion for receiving a first radio wave. A combination of the second antenna radiation electrode, the ground electrode, and the feeding pin serves as a second antenna portion for receiving a second radio wave.

The second patent document further comprises a hybrid antenna unit comprising the antenna element and a bar antenna. The bar antenna receives both of a radio wave of AM/FM radio bands and a radio wave for a mobile telephone or a car phone. The antenna element is mounted on a circuit board. The circuit board comprises a first processing circuit for processing the first radio wave to produce a first processed signal, a second processing circuit for processing the second radio wave to produce a second processed signal, and a combining circuit for combining the first processed signal with the second processed signal to produce a combined signal. A combination of the antenna element and the circuit board serves as an antenna unit. The antenna unit is covered by an antenna base and a top case. The bar antenna stands on the top case in a slanting position.

A composite antenna module is disclosed in Japanese Unexamined Patent Publication No. 2001-267843, namely, JP-A-2001-267843 which will be called a third patent document. The composite antenna module disclosed in the third patent document comprises a circuit board having an upper surface and a rear surface opposite to each other, a plurality of types of antennas arranged on the upper surface of the circuit board, and a circuit including a signal combining circuit part formed on the rear surface of the circuit board. The signal combining circuit part forms a combined signal of high frequency signals of the various antennas. The various antennas are for S-DAB, for VICS, for GPS, and for remote keyless entry.

A composite antenna device is disclosed in Japanese Unexamined Patent Publication No. 2007-013293, namely, JP-A-2007-013293 which will be called a fourth patent document. The composite antenna device disclosed in the fourth patent document comprises a board having a principal side and a rear side opposite to each other, a feeding electrode, a planar antenna element, an electric circuit, and a pole antenna element. The principal side of the board is connected to ground except its prescribed region (installation base). The feeding electrode is formed to the prescribed region. The planer antenna element is mounted to the principal side of the board. The electric circuit is connected to the planer antenna element and is mounted to the rear side of the board. The pole antenna element stands upright from the feeding electrode apart from the planar antenna element on the principal side of the board. The pole antenna element includes a coil part wound in a form of a coil. The planar antenna element comprises a patch antenna and for GPS. The pole antenna element is for wireless LAN.

SUMMARY OF THE INVENTION

It is therefore an object of the present invention to provide a hybrid antenna unit having a good characteristic.

Other objects of this invention will become clear as the description proceeds.

According to an aspect of this invention, a hybrid antenna unit comprises a circuit board having top and bottom surfaces opposite to each other, a planer antenna element which is mounted on the top surface of the circuit board and which receives first and second radio waves from first and second kinds of artificial satellites, an antenna base and a top cover that cover the circuit board and the planer antenna element. The antenna base faces the bottom surface of the circuit board while the top cover faces the top surface of said circuit board. A bar antenna element stands on the top cover in a slanting position. A processing unit is mounted on the bottom surface of the circuit board and is connected to the planer antenna element. The processing unit processes the first and the second radio waves. A shielding case is mounted on the bottom surface of the circuit board and shields the processing unit. A booster circuit is mounted on the circuit board and is for use in the bar antenna element.

In the afore-mentioned hybrid antenna unit according to the aspect of this invention, the planer antenna element comprises a dielectric board having a top surface and a bottom surface which are opposed to each other. The dielectric board has a board through hole which penetrates from the top surface and the bottom surface at a feeding point. A ring-shaped first antenna radiation electrode is made of a conductive film and may be formed on the top surface of the dielectric board at an outer region thereof. A second antenna radiation electrode is made of a conductive film and may being formed on the top surface of the dielectric board at a central portion thereof so as to be enclosed by the first antenna radiation electrode and to be apart from the first antenna radiation electrode. A ring-shaped non-feeding electrode is made of a conductive film and may be formed on the top surface of the dielectric board so as to be sandwiched between the first antenna radiation electrode and the second antenna radiation electrode and to be apart therefrom. A ground electrode is made of a conductive firm and may be formed on the bottom surface of the dielectric board. The ground electrode has a ground through hole which is substantially concentric with the board through hole and which has a diameter larger than that of the board through hole. A feeding pattern is formed on the top surface of the dielectric board. The feeding pattern feeds to the first antenna radiation electrode by electromagnetic coupling. A feeding pin has a first end connected to the second antenna radiation electrode at the feeding point and may have a second end which is guided to the bottom surface side of the dielectric board via the board through hole and the ground through hole. A combination of the first antenna radiation electrode, the ground electrode, and the feeding pattern serves as a first antenna portion for receiving the first radio wave. A combination of the second antenna radiation electrode, the ground electrode, and the feeding pin serves as a second antenna portion for receiving the second radio wave.

DETAILED DESCRIPTION OF THE PREFERRED EMBODIMENTS

Figure 1:
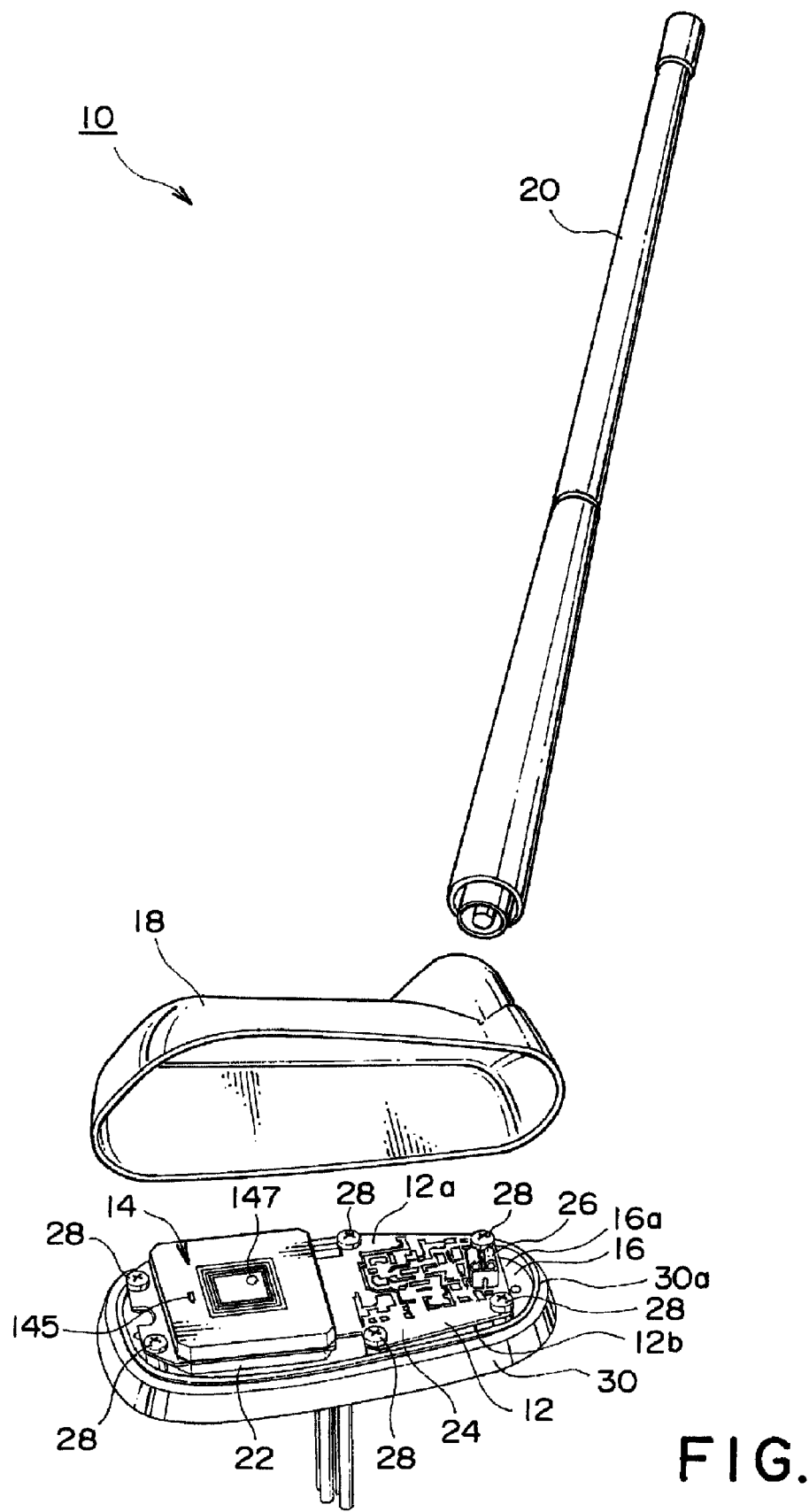
FIG. 1 is an exploded perspective view of a hybrid antenna unit according to a first exemplary embodiment of this invention.

Referring to FIG. 1, the description will proceed to a hybrid antenna unit 10 according to a first exemplary embodiment of the present invention. FIG. 1 is an exploded perspective view of the hybrid antenna unit 10.

The illustrated hybrid antenna unit 10 comprises a circuit board 12 having a top surface 12a and a bottom surface 12b which are opposite to each other, a planer antenna element 14 mounted on the top surface 12a of the circuit board 12, an antenna base 16 and a top cover 18 that cover the circuit board 12 and the planer antenna element 14, a bar antenna element 20 standing on the top cover 18 in a slanting position, a processing unit 21 (which will later be described in conjunction with FIG. 9) mounted on the bottom surface 12b of the circuit board 12, a shielding case 22 mounted on the bottom surface 12b of the circuit board 12, and a booster circuit 24 mounted on the top surface 12a of the circuit board 12.

In the manner which will later become clear, the planer antenna element 14 receives first and second radio waves from first and second kinds of artificial satellites. The planer antenna element 14 comprises a patch antenna. The antenna base 16 faces the bottom surface 12b of the circuit board 12 while the top cover 18 faces the top surface 12a of the circuit board 12. The processing unit 21 is connected to the planer antenna element 14 and processes the first and the second radio waves in the manner which will later be described. The shield cover 22 shields the processing unit 21. The booster circuit 24 is for use in the bar antenna element 20.

In other words, the bar antenna element 20 is inserted in the top cover 18. The hybrid antenna unit 10 further comprises a conductive member 26 mounted on the top surface 12a of the circuit board 12. The conductive member 26 is for connecting the bar antenna element 20 with the booster circuit 24. The booster circuit 24 is an AM/FM radio booster circuit.

The antenna base 16 comprises a die-cast base to which the circuit board 12 is attached by using a plurality of screws 28 apart from a main surface 16a of the antenna base 16 by a predetermined distance. The top cover 18 and the antenna base 16 are attached and fixed to each other. The antenna base 16 is surrounded by a base pad 30. The base pad 30 is made of elastic resin and has a wall portion 30a. The base pad 30 is mounted to the antenna base 16 with the wall portion 30a fitted to an outer edge portion of the antenna base 16.

Figure 2A:
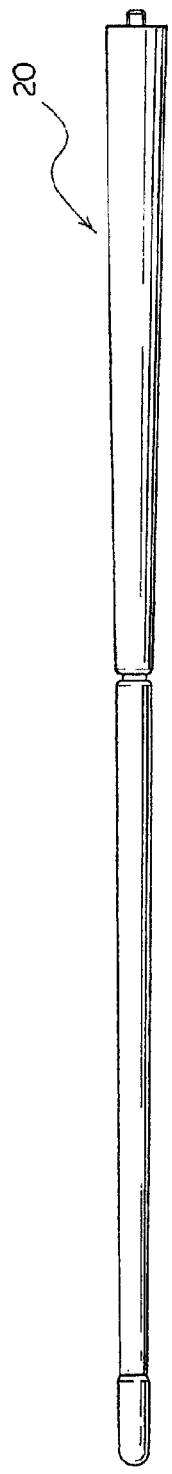
FIG. 2A is a side view showing an outer appearance of the bar antenna element for use in the hybrid antenna unit illustrated in FIG. 1.
Figure 2B:
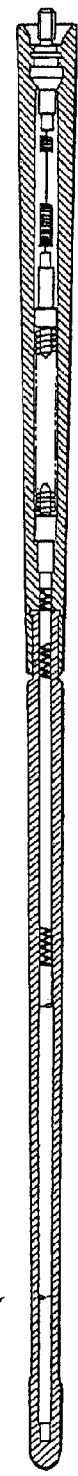
FIG. 2B is a cross-sectional view of the bar antenna element illustrated in FIG. 2A.
Figure 2C:
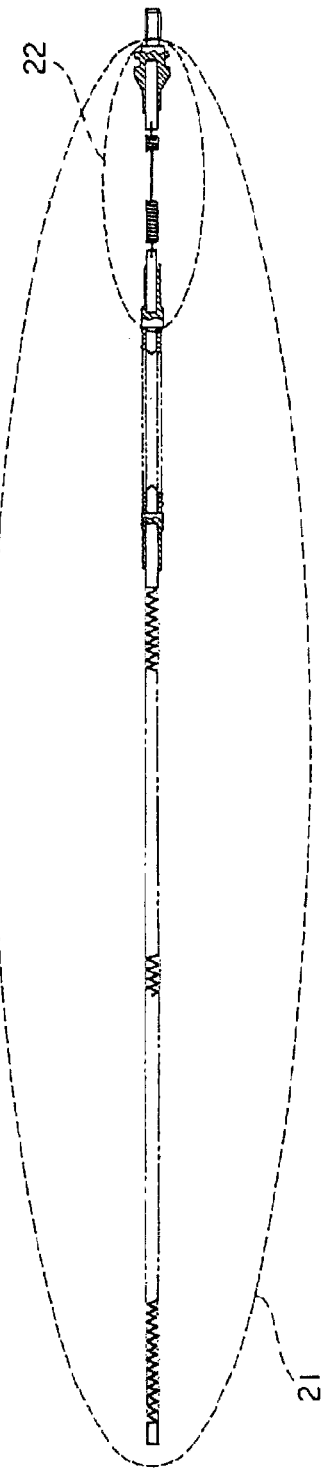
FIG. 2C is a view showing the bar antenna element illustrated in FIG. 2A with a body thereof omitted.

FIGS. 2A, 2B, and 2C show the bar antenna element 20 for use in the hybrid antenna unit 10. FIG. 2A is a side view showing an outer appearance of the bar antenna element 20. FIG. 2B is a cross-sectional view of the bar antenna element 20. FIG. 2C is a view showing the bar antenna element 20 with a body thereof omitted.

As shown in FIG. 2C, the bar antenna element 20 comprises a first pole antenna element 21 and a second pole antenna element 22. The first pole antenna element 21 extends from a tip of the bar antenna element 20 to a base end part thereof. The first pole antenna element 21 is for receiving a radio wave of AM/FM radio bands. The second pole antenna element 22 is a portion between the base end part of the bar antenna element 20 and a predetermined position apart from the base end part by a predetermined distance. The second pole antenna element 22 is for transmitting and receiving a radio wave for a cellular telephone or a car phone.

Although the booster circuit 24 is mounted on the top surface 12a of the circuit board 12 in the first exemplary embodiment of this invention, the booster circuit 24 may be mounted on the bottom surface 12b of the circuit board 12 in the manner which will presently be described.

Figure 3:
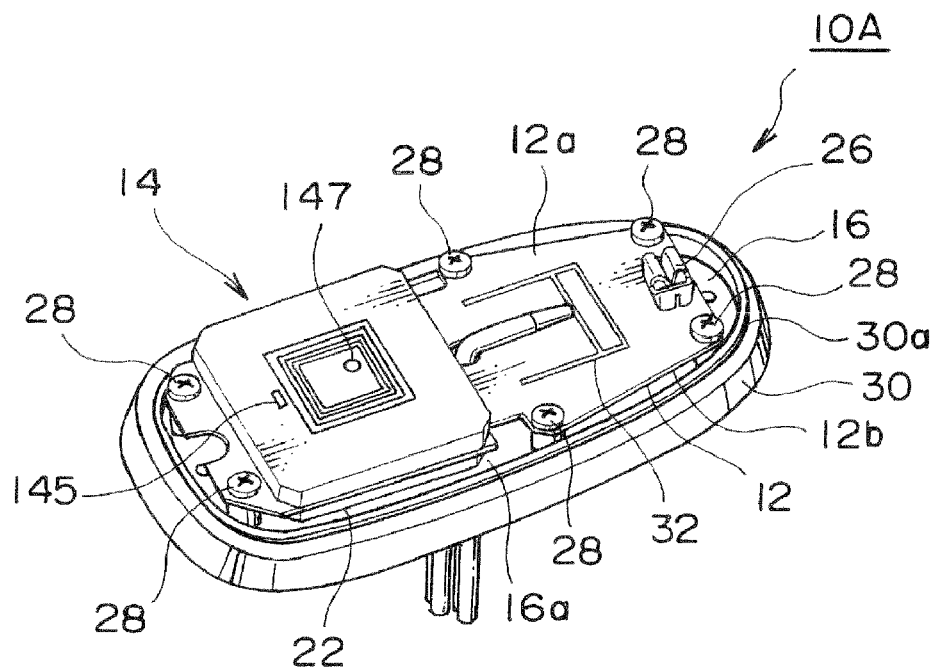
FIG. 3 is a perspective view of a hybrid antenna unit according to a second exemplary embodiment of the present invention with the top cover and the bar antenna element omitted.

Referring to FIG. 3, the description will proceed to a hybrid antenna unit 10A according to a second exemplary embodiment of the present invention. FIG. 3 is a perspective view of the hybrid antenna unit 10A with the top cover 18 and the bar antenna element 20 omitted. The hybrid antenna unit 10A is similar in structure to the hybrid antenna unit 10 except that the booster circuit (not shown) is mounted on the bottom surface 12b of the circuit board 12 and the hybrid antenna unit 10A further comprises a WiFi antenna element 32. Components having similar functions illustrated in FIG. 1 are attached with the same reference symbols in FIG. 3 and differences will be described.

The WiFi antenna element 32 comprises a printed pattern antenna which is printed on the top surface 12a of the circuit board 12.

Figure 4:
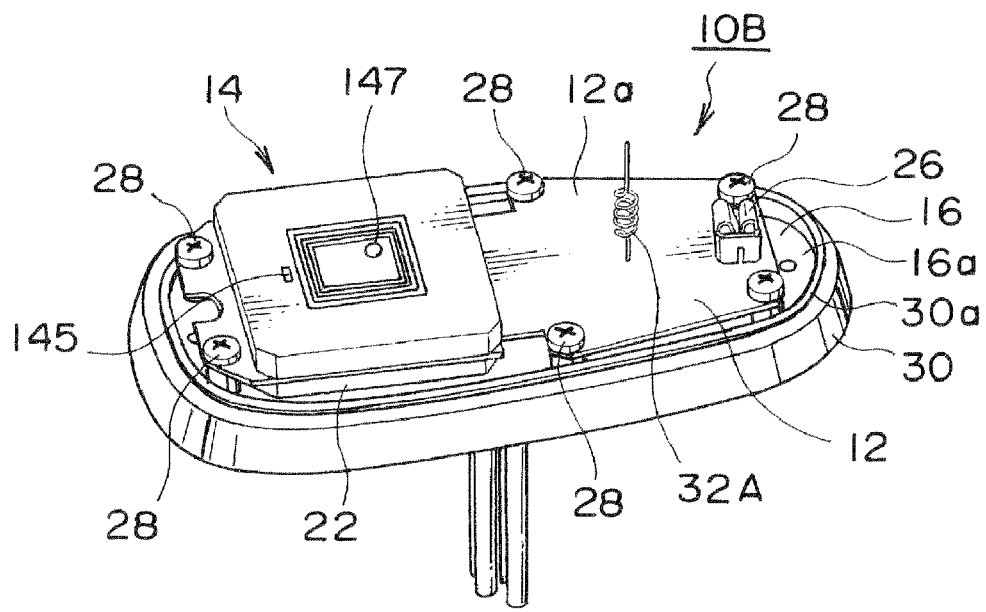
FIG. 4 is a perspective view of a hybrid antenna unit according to a third exemplary embodiment of the present invention with the top cover and the bar antenna element omitted.

Referring to FIG. 4, the description will proceed to a hybrid antenna unit 10B according to a third exemplary embodiment of the present invention. FIG. 4 is a perspective view of the hybrid antenna unit 10B with the top cover 18 and the bar antenna element 20 omitted. The hybrid antenna unit 10B is similar in structure and operation to the hybrid antenna unit 10A except that the WiFi antenna element is modified from that illustrated in FIG. 3 as will later become clear. The WiFi antenna element is therefore depicted at 32A.

The WiFi antenna element 32A comprises a monopole antenna which stands on the top surface 12a of the circuit board 12.

Figure 5:
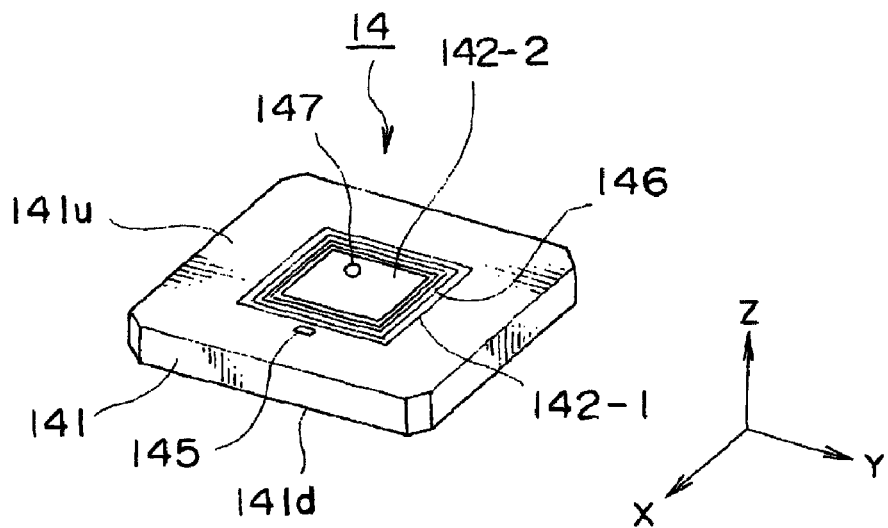
FIG. 5 is a perspective view showing a planer antenna element (a patch antenna) for use in each of the hybrid antenna units illustrated in FIGS. 1, 3, and 4.
Figure 6:
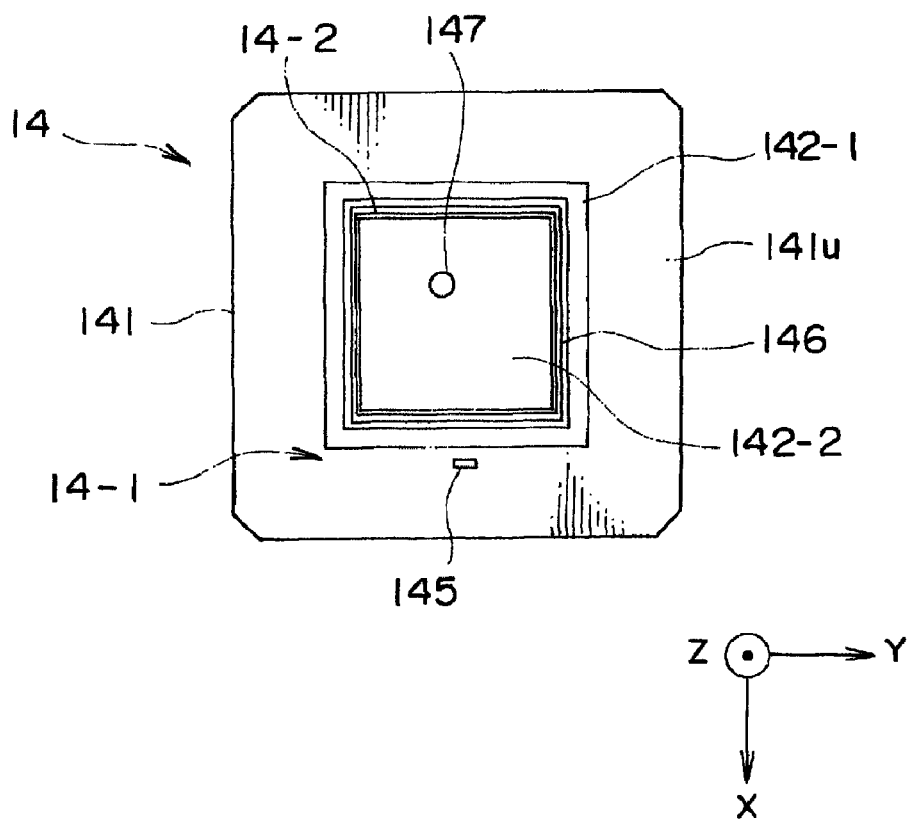
FIG. 6 is a plan view of the planer antenna element (the patch antenna) illustrated in FIG. 5.
Figure 7:
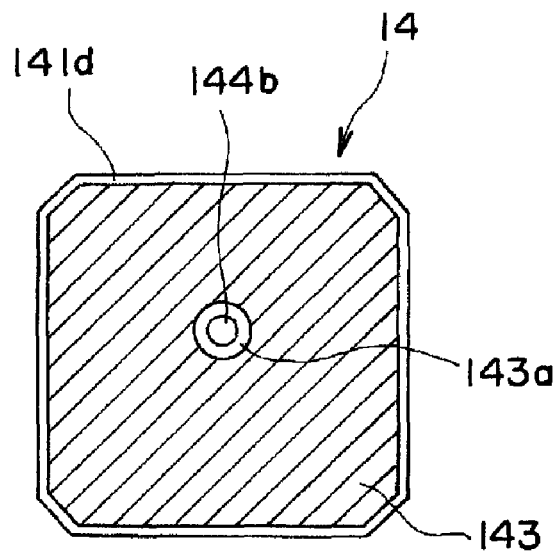
FIG. 7 is a bottom view of the planer antenna element (the patch antenna) illustrated in FIG. 5.
Figure 8:
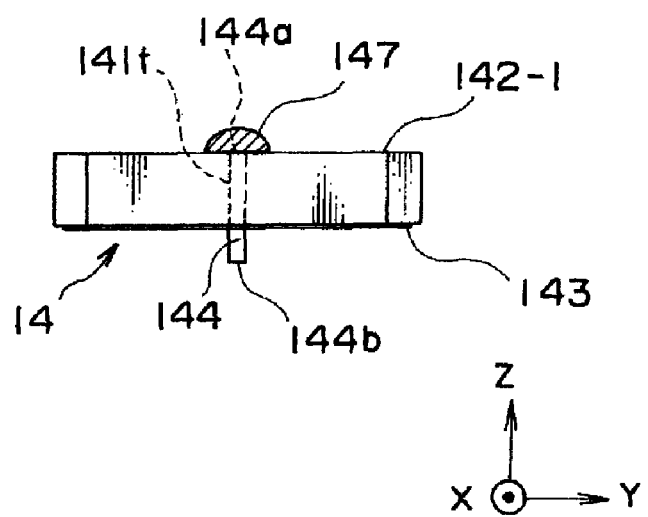
FIG. 8 is a front view of the planer antenna element (the patch antenna) illustrated in FIG. 5.

Referring to FIGS. 5 through 8, the description will proceed to the planer antenna element 14 for use in each of the hybrid antenna units 10, 10A, and 10B illustrated in FIGS. 1, 3, and 4. FIG. 5 is a perspective view showing the planer antenna element (the patch antenna) 14. FIG. 6 is a plan view of the planer antenna element (the patch antenna) 14 illustrated in FIG. 5. FIG. 7 is a bottom view of the planer antenna element (the patch antenna) 14 illustrated in FIG. 5. FIG. 8 is a front view of the planer antenna element (the patch antenna) 14 illustrated in FIG. 5.

Herein, in the manner shown In FIGS. 5 to 8, an orthogonal coordinate system (X, Y, Z) is used. In a state illustrated in FIGS. 5 to 8, in the orthogonal coordinate system (X, Y, Z), an X-axis direction is a fore-and-aft direction (a depth direction), a Y-axis direction is a left-and-right direction (a width direction), and a Z-axis direction is an up-and-down direction (a height direction, a thickness direction).

The illustrated planer antenna element (the patch antenna) 14 is a planer antenna element for receiving first and second radio waves which are different from each other. The planer antenna element 14 comprises a dielectric board 141 having configuration of a substantially rectangular parallelepiped, first and second antenna radiation electrodes (radiation elements) 142-1 and 142-2, a ground electrode (a ground conductor) 143, a rod-shaped feeding pin 144, a feeding pattern 145, and a non-feeding electrode 146.

The illustrated dielectric board 141 is made of a ceramic material having a high permittivity (e.g. a relative permittivity $\in_r$ of 20) such as barium titanate. The dielectric board 141 has a top surface (an upper surface) 141u and a bottom surface (a lower surface) 141d which are opposed to each other in the up-and-down direction Z. In the example being illustrated, the dielectric board 141 has corners which are chamfered.

The dielectric board 141 has a board through hole 141t (see FIG. 8) for penetrating from the top surface 141u to the bottom surface 141d at a position where a feeding point 147 is mounted.

The first antenna radiation electrode 142-1 is made of a conductive film. The first antenna radiation electrode 142-1 is formed on the top surface 141u of the dielectric board 141 at an outer region thereof. The first antenna radiation electrode 142-1 is shaped like a ring. The first antenna radiation electrode 142-1 is formed, for example, by silver pattern printing.

The second antenna radiation electrode 142-2 is also made of a conductive film. The second antenna radiation electrode 142-2 is formed on the top surface 141u of the dielectric board 141 at a central portion thereof. The illustrated second antenna radiation electrode 142-2 is a rectangle in shape. The second antenna radiation electrode 142-2 is enclosed by the first antenna radiation electrode 142-1 and is apart from the first antenna radiation electrode 142-1. The second antenna radiation electrode 142-2 is formed, for example, by silver pattern printing.

The non-feeding electrode 146 is also made of a conductive film. The non-feeding electrode 146 is formed on the top surface 141u of the dielectric board 141 so as to be sandwiched between the first antenna radiation electrode 142-1 and the second antenna radiation electrode 142-2 and to be apart therefrom. The non-feeding electrode 146 is shaped like a ring. The non-feeding electrode 146 is formed, for example, by silver pattern printing.

As shown in FIG. 7, the ground electrode 143 is made of a conductive film. The ground electrode 143 is formed on the bottom surface 141d of the dielectric board 141. The ground electrode 143 has a ground through hole 143a which is substantially concentric with the board through hole 141t and which has a diameter larger than that of the board through hole 141t.

The above-mentioned feeding point 147 is disposed at a position which is displaced from a center of the second antenna radiation electrode 142-2 in the X-axis direction and in the Y-axis direction. To the feeding point 147, a first end 144a of the feeding pin 144 is connected. The feeding pin 144 has a second end 144b which is guided toward the undersurface via the board through hole 141t and the ground through hole 143a so as to be apart from the ground electrode 143. Herein, solder is used as the feeding point 147. Therefore, the feeding point 147 has a convex shape which is bowed outward from a main surface of the second antenna radiation element 142-2.

The feeding pattern 145 is formed on the top surface 141u of the dielectric board 141. The feeding pattern 145 is for feeding to the first antenna radiation element 142-1 by electromagnetic coupling.

In the planer antenna element 14 has such a structure, a combination of the first antenna radiation element 142-1, the ground electrode 143, and the feeding pattern 145 serves as a first antenna portion 14-1 for receiving the first radio wave. A combination of the second antenna radiation element 142-2, the ground electrode 143, and the feeding pin 144 serves as a second antenna portion 14-2 for receiving the second radio wave. In the example being illustrated, the first antenna portion 14-1 comprises a GPS antenna portion for receiving, as the first radio wave, a GPS signal from GPS satellites. The second antenna portion 14-2 comprises a SDARS antenna portion for receiving, as the second radio wave, a SDARS signal from SDARS satellites.

Inasmuch as such a planer antenna element (patch antenna) 14 comprises the first antenna portion (the GPS antenna portion) 14-1 and the second antenna portion (the SDARS antenna portion) 14-2 which are integrally formed in the single dielectric board 141, it is possible to come down in size in comparison with that where two antenna elements are put side by side with each other in the manner which is described in the above-mentioned first patent document.

Figure 9:
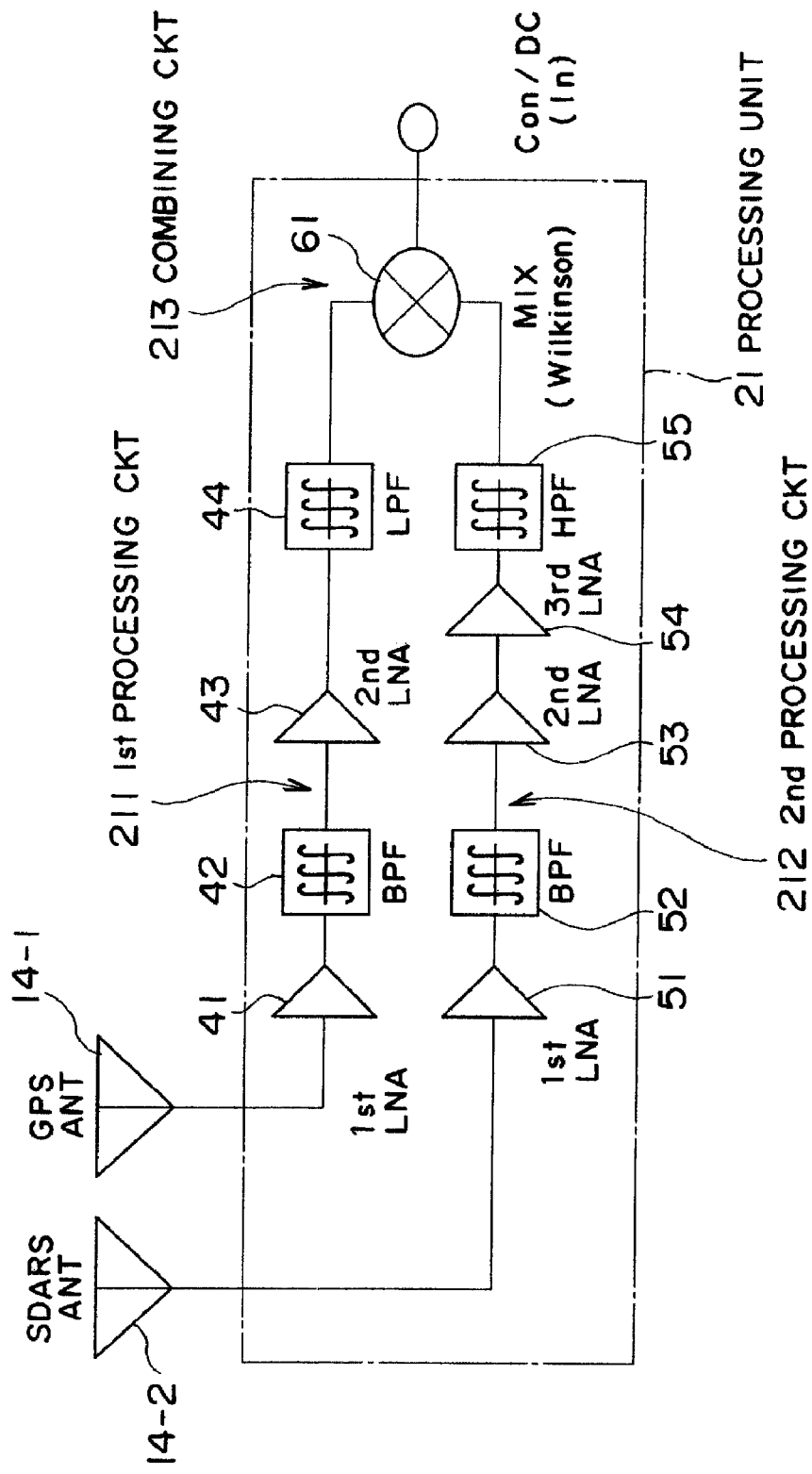
FIG. 9 is a block diagram of a processing unit for use in each of the hybrid antenna units illustrated in FIGS. 1, 3, and 4.

Referring to FIG. 9, the description will proceed to the processing unit depicted at 21 for use in each of the hybrid antenna units 10, 10A, and 10B illustrated in FIGS. 1, 3, and 4.

The processing unit 21 comprises a first processing circuit 211, a second processing circuit 212, and a combining circuit 213. The first processing circuit 211 processes the first radio wave to produce a first processed signal. The second processing circuit 212 processes the second radio wave to produce a second processed signal. The combining circuit 213 combines the first processed signal with the second processed signal to produce a combined signal.

In the manner which is described above, in the illustrated planer antenna element (patch antenna) 14, the first antenna portion 14-1 comprises the GPS antenna portion for receiving, as the first radio wave, the GPS signal from the GPS satellites while the second antenna portion 14-2 comprises the SDARS antenna portion for receiving, as the second radio wave, the SDARS signal from the SDARS satellites. Under the circumstances, the first processing circuit 211 includes a GPS low noise amplifying portion for amplifying a weak GPS signal received by the GPS antenna portion 14-1 to produce an amplified GPS signal as the first processed signal. The second processing circuit 212 includes a SDARS low noise amplifying portion for amplifying a weak SDARS signal received by the SDARS antenna portion 14-2 to produce an amplified SDARS signal as the second processed signal.

Inasmuch as each of the hybrid antenna units 10, 10A, and 10B according to the first through the third exemplary embodiments of this invention mixes and processes the first radio wave and the second radio wave in the manner which is described above, it results in space savings and it is possible to reduce costs.

The first processing circuit 211 comprises a first GPS amplifier 41, a GPS band-pass filter 42 a second GPS amplifier 43, and a low-pass filter (LPF) 44. The first GPS amplifier 41 amplifies the GPS signal received by the GPS antenna portion 14-1 to produce a first GPS amplified signal. The GPS band-pass filter 42 passes through a signal of a GPS band (a frequency band of 15 GHz) among the first GPS amplified signal to produce a GPS band-pass filtered signal. The second GPS amplifier 43 amplifies the GPS band-pass filtered signal to produce a second GPS amplified signal as the first processed signal. A combination of the first GPS amplifier 41, the GPS band-pass filter 42, and the second GPS amplifier 43 serves as the above-mentioned GPS low noise amplifying portion. The low-pass filter 44 passes through the second GPS amplified signal (the first processed signal) as it is and inhibits the combined signal from the combining circuit 213 which will later be described from flowing back to the GPS low noise amplifying portion in question That is, the low-pass filter 44 acts as a first backflow preventing arrangement for preventing the combined signal from flowing from the combining circuit 213 back to the GPS low noise amplifying portion. At any rate, the second GPS amplified signal is supplied to the combining circuit 213 as the first processed signal through the low-pass filter 44.

The second processing circuit 212 comprises a first SDARS amplifier 51, a SDARS band-pass filter 52, a second SDARS amplifier 53, a third SDARS amplifier 54, and a high-pass filter (HPF) 55. The first SDARS amplifier 51 amplifies the SDARS signal received by the SDARS antenna portion 14-2 to produce a first SDARS amplified signal The SDARS band-pass filter 52 passes through a signal of a SDARS band (a frequency band of 2.3 GHz) among the first SDARS amplified signal to produce a SDARS band-pass filtered signal. The second SDARS amplifier 53 amplifies the SDARS band-pass filtered signal to produce a second SDARS amplified signal. The third SDARS amplifier 54 amplifies the second SDARS amplified signal to produce a third SDARS amplified signal as the second processed signal. A combination of the first SDARS amplifier 51, the SDARS band-pass filter 52, the second SDARS amplifier 53, and the third SDARS amplifier 54 serves as the above-mentioned SDARS low noise amplifying portion The high-pass filter 55 passes through the third SDARS amplified signal (the second processed signal) at it is and inhibits the combined signal from the combining circuit 213 which will later be described from flowing back to the SDARS low noise amplifying portion in question. That is, the high-pass filter 55 acts as a second backflow preventing arrangement for preventing the combined signal from flowing from the combining circuit 213 back to the SDARS low noise amplifying portion. At any rate, the third SDARS amplified signal is supplied to the combining circuit 213 as the second processed signal through the high-pass filter 55.

The combining circuit 213 comprises a mixer 61. The illustrated mixer 61 is a Wilkinson type mixer. The mixer 61 combines or mixes the second GPS amplified signal (the first processed signal) with the third SDARS amplified signal (the second processed signal) to produce the above-mentioned combined signal or a mixed signal. Although the mixer 61 is used for combining the second GPS amplified signal (the first processed signal) with the third SDARS amplified signal (the second processed signal), the mixer 61 may not be used and the above-mentioned combining may be made by using only a wiring pattern for coupling two signal lines into a single signal line.

In the aforementioned hybrid antenna unit according to the aspect of this invention, the bar antenna element may include a first pole antenna element and a second pole antenna element. In this event, the booster circuit is for use in the first pole antenna element. The first pole antenna element may be for receiving a radio wave of AM/FM radio bands and the second pole antenna element may be for transmitting and receiving a radio wave for cellular telephone. The booster circuit may be mounted on the top surface of the circuit board. Alternatively, the booster circuit may be mounted on the bottom surface of the circuit board. Under the circumstances, the hybrid antenna unit further may comprise a WiFi antenna element mounted on the top surface of the circuit board. The WiFi antenna element may comprise a printed pattern antenna which is printed on the top surface of the circuit board. Alternatively, the WiFi antenna element may comprise a monopole antenna which stands on the top surface of the circuit board.

In the above-mentioned planer antenna element, the dielectric board may be made of a ceramic material. Each of the first and the second radiation electrodes and the non-feeding electrode may be formed by silver pattern printing.

In the afore-mentioned hybrid antenna unit according to the aspect of this invention, the processing unit may comprise a first processing circuit processing a first received signal received by the first antenna portion to produce a first processed signal, a second processing unit processing a second received signal received by the second antenna portion to produce a second processed signal, and a combining circuit for combining the first processed signal with the second processed signal to produce a combined signal. The first antenna portion may comprise a GPS (Global Positioning System) antenna portion receiving, as the first radio wave, a GPS signal from GPS satellites as the first kind of artificial satellites. The second antenna portion may comprise a SDARS (Satellite Digital Audio Radio Service) antenna portion receiving, as the second radio wave, a SDARS signal from SDARS satellites as the second kind of artificial satellites. In this event, the first processing circuit includes a GPS low noise amplifying portion amplifying the GPS signal to produce an amplified GPS signal as the first processed signal, and the second processing circuit includes a SDRAS low noise amplifying portion amplifying the SDARS signal to produce an amplified SDARS signal as the second processed signal. The first processing circuit preferably may further comprise a first back-flow preventing arrangement for preventing the combined signal from flowing from the combining circuit back to the GPS low noise amplifying portion, and the second processing circuit preferably may further comprise a second back-flow preventing arrangement for preventing the combined signal from flowing from the combining circuit back to the SDARS low noise amplifying portion. The first backflow preventing arrangement may comprise, for example, a low-pass filter which passes the first processed signal to the combining circuit and which inhibits the combined signal from flowing back to the GPS low noise amplifying portion, and the second backflow preventing arrangement may comprise, for example, a high-pass filter which passes the second processed signal to the combined circuit and which inhibits the combined signal from flowing back to the SDARS low noise amplifying portion.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims. For example a material of the dielectric board is not restricted to the ceramic material and the dielectric board may be made of resin material. In addition, although the planer antenna element (the patch antenna) according to this invention is adequate for receiving the GPS signal and the SDARS signal this invention is not restricted to this and may be applicable to a planer antenna element for receiving first and second radio waves which are different from each other.

What is claimed is:
1. A hybrid antenna unit comprising:
a circuit board having top and bottom surfaces opposite to each other;
a planer antenna element mounted on the top surface of said circuit board and receiving first and second radio waves from first and second kinds of artificial satellites;
an antenna base and a top cover that cover said circuit board and said planer antenna element, said antenna base facing the bottom surface of said circuit board, said top cover facing the top surface of said circuit board;
a bar antenna element standing on said top cover in a slanting position;
a processing unit mounted on the bottom surface of said circuit board and connected to said planer antenna element, said processing unit processing the first and the second radio waves;
a shielding case mounted on the bottom surface of said circuit board and shielding said processing unit; and
a booster circuit mounted on said circuit board and being for use in said bar antenna element, wherein said planer antenna element comprises:
a dielectric board having a top surface and a bottom surface which are opposed to each other, said dielectric board having a board through hole which penetrates from the top surface and the bottom surface at a feeding point;
a ring-shaped first antenna radiation electrode made of a conductive film, said first antenna radiation electrode being formed on the top surface of the dielectric board at an outer region thereof;
a second antenna radiation electrode made of a conductive film, said second antenna radiation electrode being formed on the top surface of said dielectric board at a central portion thereof so as to be enclosed by said first antenna radiation electrode and to be apart from said first antenna radiation electrode;
a ring-shaped non-feeding electrode made of a conductive film, said non-feeding electrode being formed on the top surface of said dielectric board so as to be sandwiched between said first antenna radiation electrode and said second antenna radiation electrode and to be apart therefrom;
a ground electrode made of a conductive firm, said ground electrode being formed on the bottom surface of said dielectric board, said ground electrode having a ground through hole which is substantially concentric with the board through hole and which has a diameter larger than that of the board through hole;
a feeding pattern formed on the top surface of said dielectric board, said feeding pattern feeding to said first antenna radiation electrode by electromagnetic coupling; and
a feeding pin having a first end connected to said second antenna radiation electrode at the feeding point, said feeding pin having a second end which is guided to the bottom surface side of said dielectric board via the board through hole and the ground through hole,
wherein a combination of said first antenna radiation electrode, said ground electrode, and said feeding pattern serves as a first antenna portion for receiving the first radio wave, and a combination of said second antenna radiation electrode, said ground electrode, and said feeding pin serves as a second antenna portion for receiving the second radio wave.

2. The hybrid antenna unit as claimed in claim 1, wherein said bar antenna unit includes a first pole antenna element and a second pole antenna element, said booster circuit being for use in said first pole antenna element.

3. The hybrid antenna unit as claimed in claim 2, wherein said first pole antenna element is for receiving a radio wave of AM/FM radio bands, said second pole antenna element is for transmitting and receiving a radio wave for cellular telephone.

4. The hybrid antenna unit as claimed in claim 2, wherein said booster circuit is mounted on the top surface of said circuit board.

5. The hybrid antenna unit as claimed in claim 2, wherein said booster circuit is mounted on the bottom surface of said circuit board, wherein said hybrid antenna unit further comprises a WiFi antenna element mounted on the top surface of said circuit board.

6. The hybrid antenna unit as claimed in claim 5, wherein said WiFi antenna element comprises a printed pattern antenna which is printed on the top surface of said circuit board.

7. The hybrid antenna unit as claimed in claim 6, wherein said WiFi antenna element comprises a monopole antenna which stands on the top surface of said circuit board.

8. The hybrid antenna unit as claimed in claim 1, wherein said dielectric board is made of a ceramic material.

9. The hybrid antenna unit as claimed in claim 1, wherein each of said first and said second radiation electrodes and said non-feeding electrode is formed by silver pattern printing.

10. The hybrid antenna unit as claimed in claim 1, wherein said processing unit comprises:
a first processing circuit processing a first received signal received by said first antenna portion to produce a first processed signal;
a second processing unit processing a second received signal received signal by said second antenna portion to produce a second processed signal; and
a combining circuit for combining the first processed signal with the second processed signal to produce a combined signal.

11. The hybrid antenna unit as claimed in claim 10, wherein said first antenna portion comprises a GPS (Global Positioning System) antenna portion receiving, as the first radio wave, a GPS signal from GPS satellites as the first kind of artificial satellites and wherein said second antenna portion comprises a SDARS (Satellite Digital Audio Radio Service) antenna portion receiving, as the second radio wave, a SDARS signal from SDARS satellites as the second kind of artificial satellites.

12. The hybrid antenna unit as claimed in claim 11, wherein
said first processing circuit includes a GPS low noise amplifying portion amplifying the GPS signal to produce an amplified GPS signal as the first processed signal, and
said second processing circuit including a SDRAS low noise amplifying portion amplifying the SDARS signal to produce an amplified SDARS signal as the second processed signal.

13. The hybrid antenna unit as claimed in claim 12, wherein
said first processing circuit further comprises a first backflow preventing arrangement for preventing the combined signal from flowing from said combining circuit back to said GPS low noise amplifying portion, and
said second processing circuit further comprising a second back-flow preventing arrangement for preventing the combined signal from flowing from said combining circuit back to said SDARS low noise amplifying portion.

14. The hybrid antenna unit as claimed in claim 13, wherein
said first backflow preventing arrangement comprises a low-pass filter passing the first processed signal to said combining circuit and inhibiting the combined signal from flowing back to said GPS low noise amplifying portion, and
said second backflow preventing arrangement comprising a high-pass filter passing the second processed signal to said combined circuit and inhibiting the combined signal from flowing back to said SDARS low noise amplifying portion.

* * * * *